United States Patent
Hendrickson et al.

(10) Patent No.: US 9,222,699 B1
(45) Date of Patent: Dec. 29, 2015

(54) MICROPROCESSOR CONTROLLED FUEL FILTER HEATER

(71) Applicants: James R. Hendrickson, Silverthorne, CO (US); Todd R. Alcock, Frisco, CO (US); Scott A. Alcock, Rockton, IL (US)

(72) Inventors: James R. Hendrickson, Silverthorne, CO (US); Todd R. Alcock, Frisco, CO (US); Scott A. Alcock, Rockton, IL (US)

( * ) Notice: Subject to any disclaimer, the term of this patent is extended or adjusted under 35 U.S.C. 154(b) by 308 days.

(21) Appl. No.: 13/733,673

(22) Filed: Jan. 3, 2013

Related U.S. Application Data (60) Provisional application No. 61/582,777, filed on Jan. 3, 2012.

(51) Int. Cl.
*F24H 1/10* (2006.01)
*H05B 1/00* (2006.01)
*F24H 9/00* (2006.01)

(52) U.S. Cl.
CPC ........................................ *F24H 9/00* (2013.01)

(58) Field of Classification Search
None
See application file for complete search history.

(56) References Cited

U.S. PATENT DOCUMENTS

| | | | | |
|---|---|---|---|---|
| 1,642,197 A * | 9/1927 | Fowler | ............................ | 219/528 |
| 2,423,488 A * | 7/1947 | Dowe | ............................ | 219/528 |
| 4,404,949 A | 9/1983 | Bell | | |
| 4,442,819 A | 4/1984 | Veach | | |
| 4,498,446 A | 2/1985 | Judson | | |
| 4,499,886 A | 2/1985 | Hinds | | |
| 4,675,503 A * | 6/1987 | Toivio et al. | ................... | 219/205 |
| 4,833,299 A * | 5/1989 | Estes | .............................. | 392/444 |
| 5,017,758 A * | 5/1991 | Kirkman et al. | ............... | 219/205 |
| 5,197,595 A * | 3/1993 | Coultas | ........................... | 206/0.6 |
| 5,352,862 A * | 10/1994 | Barr | .............................. | 219/205 |
| 5,408,068 A * | 4/1995 | Ng | ................................. | 219/202 |
| 5,436,429 A * | 7/1995 | Cline | ............................. | 219/202 |
| 5,632,919 A * | 5/1997 | MacCracken et al. | ........ | 219/494 |
| 5,827,050 A * | 10/1998 | Price | .............................. | 417/207 |
| 5,981,910 A | 11/1999 | Williams et al. | | |
| 6,018,137 A * | 1/2000 | Reiff | ............................. | 219/205 |
| 6,177,658 B1 * | 1/2001 | White et al. | .................. | 219/535 |
| 6,232,577 B1 * | 5/2001 | Reiff | ............................. | 219/205 |
| 6,278,091 B1 * | 8/2001 | Van Gooden | ................. | 219/528 |
| 6,353,211 B1 * | 3/2002 | Chen | ............................. | 219/527 |
| 6,493,508 B1 * | 12/2002 | Roesgen | ........................ | 392/485 |
| 6,870,135 B2 * | 3/2005 | Hamm et al. | .................. | 219/386 |
| 6,921,880 B2 * | 7/2005 | Berger | ........................... | 219/386 |
| 6,969,831 B1 * | 11/2005 | Parker et al. | .................. | 219/528 |
| 7,040,299 B2 | 5/2006 | Dickerson | | |
| 7,832,382 B2 | 11/2010 | Poje | | |
| 2003/0116490 A1 | 6/2003 | Keyster et al. | | |
| 2006/0098964 A1 * | 5/2006 | Haubold et al. | ............... | 392/447 |
| 2007/0068923 A1 * | 3/2007 | Augustine et al. | .......... | 219/465.1 |
| 2008/0147152 A1 * | 6/2008 | Quincy et al. | ................. | 607/112 |
| 2011/0166635 A1 * | 7/2011 | Nelson | .......................... | 607/112 |

OTHER PUBLICATIONS

AVS Industries, AVS Fiberglass SilRub-2 CS-26 Series, Sep. 2009, www.avsind.com.
Silicone Rubber heating blanket, www.omega.com.

* cited by examiner

*Primary Examiner* — Thor Campbell
(74) *Attorney, Agent, or Firm* — Patent Law of Rick Martin, P.C.

(57) ABSTRACT

A rubber heat pad is integrated into a fiberglass fiber insulator to form a heater blanket for a diesel fuel filter and other truck components. A controller monitors ambient temperatures and pad temperatures and the battery flow state. If it is cold, and the battery has available power, then a heat pad(s) is turned ON. When the pad(s) gets too hot, then it is turned OFF by the controller. Truck park mode allows AC power. On the road use triggers an inverter to supply AC to the pads.

10 Claims, 8 Drawing Sheets

MICROPROCESSOR CONTROLLED FUEL FILTER HEATER

CROSS REFERENCE TO RELATED APPLICATIONS

This application is a regular utility application filed under 35 USC 111 (a) claiming the benefit of U.S. provisional application No. 61/882,777 filed under 35 USC 119 (e) on Jan. 3, 2011.

FIELD OF INVENTION

The present invention relates to a snap on heater blanket for a diesel fuel filter, wherein the heater is controlled by a microprocessor and can draw power from a vehicle battery or a land source of AC.

BACKGROUND OF THE INVENTION

This invention relates to filter heaters, and in particular, to a heated thermal filter cover for use with diesel fuels, which gel at temperatures of less then 32° F. Gelling causes the diesel fuel to separate into individual components including a waxy component. This waxy component is incapable of flowing through the fine mesh inside a diesel fuel filter.

The fuel filter for diesel engines of trucks, for example, are often outside the truck's engine compartment. The filter, therefore, is subjected to the ambient atmosphere. When it gets cold, e.g., less than 0° F., the filter will get cold, and the diesel fuel, which is not heated, will gel in the filter. When the fuel gels in the filter, fuel cannot pass through the filter, and thus, fuel will not reach the engine. The engine, therefore, will stall or the operator will be unable to start the engine. When fuel gels in the filter, the only recourse for the operator is to pull the truck over to the side of the road and replace the fuel filter. If the operator does not have a spare fuel filter with him, he must wait for a new filter to be delivered. Alternatively additives can be added to the fuel and filter, and a chemical bath may free up the filter. As can be appreciated, either of these options takes a considerable amount of time. Further, the gelling of fuel in the filter requires a filter to be replaced prematurely, i.e., before it would otherwise not have to be replaced. Both the time spent replacing the filter and the cost of the new filter increase the cost of transporting goods over the road.

Many have attempted to develop filter heaters to prevent fuels from gelling in filters. Most of these filter heaters, however, are complicated and expensive to build, and difficult to install. For example, there are several filter heaters which use heated cooling fluid from the engine to maintain the filter, and the fuel in the filter, above the fuel's gelling temperature. Such filter heaters are difficult to install because they must be interconnected with the engine's cooling system.

Other filter heaters are electrical. Although it is easier to connect the heater to the engine's electrical system than to the cooling system, the electrical heaters are difficult to install over the filter. Hence, they are also difficult to remove from the filter to change the filter. As can be appreciated, a heater which is difficult to remove and install only makes the changing of the filter more difficult and time consuming. Fuel filters must be replaced every 20,000-30,000 miles in trucks. In many trucking operations, this distance is traveled very quickly (i.e., in a month or less). In filter heaters that are difficult to install and to remove from the filter, the time wasted because of the difficulty in changing the fuel filter will add up quickly. The closest known art is U.S. Pat. No. 5,981, 910 which discloses an insulated bag attached over the fuel filter. A battery powered low amp (0.7-1.1 amp) resistor stays on all the time as controlled by a driver's switch.

What is needed in the art is an automatic temperature controlled fuel filter heater that can sense either the ambient temperature or the fuel temperature and, using an algorithm, heat the fuel filter to prevent gelling. Selection of power from the vehicle battery or an AC circuit is needed.

The present invention addresses all these problems using a microprocessor based snap on heater wrap for a fuel filter.

SUMMARY OF THE INVENTION

The main aspect of the preset invention is to provide an automatic temperature controlled heater for a diesel fuel filter.

Another aspect of the present invention is to provide a microprocessor to control the heater and use a temperature sensor to determine the heat cycles.

Another aspect of the present invention is to use the microprocessor to sense a battery drain and decrease the heat.

Other aspects of this invention will appear from the following description and appended claims, reference being made to the accompanying drawings forming a part of this specification wherein like reference characters designate corresponding parts in the several views.

Various fuel additives exist to prevent diesel from gelling and subsequently clogging the diesel fuel filter. Although they help to prevent gelling, they are all consumed during operation, are expensive, and ultimately fail at extremely low temperatures.

The system is comprised of a micro-processor based controller with relays that deliver power to the filter heater pads, directly from ac-mains power, or through a 12 vdc converter (inverter).

The filter pad(s) are held forcefully in contact with the fuel filter(s) in a way that maximizes heat transfer to the fuel filter, and minimizes heat loss to the outside environment.

During operation the controller senses conditions typical of a phenomenon called diesel 'gelling'. Gelling occurs at low temperature and causes the diesel fuel to separate into individual components, including a waxy component that is incapable of flowing, undissolved, through the fine mesh inside a diesel fuel filter.

A single controller is capable of operating in two modes of operation:

Open loop control where the outside air temperature determines the amount of power applied to the filter heater. The control algorithm calculates thermal requirements based on direct measurement of outside air temperature, estimated filter emissivity and estimated fuel flow.

Closed loop control allows the fuel temperature to determine the amount of power applied to the filter heater. The control algorithm calculates thermal requirements based on direct measurement of the fuel temperature, estimated filter emissivity and estimated fuel flow.

The system provides power to the pad from one of two sources: standard mains power, or battery power via an 12 vdc to 115 vac inverter.

When mains power is available it is used exclusively: Power is applied to the pad when cold conditions exist, for pre-set amounts of time. After that the amount of power delivered varies based on the mode of operation (open or closed). The duty cycle of the controller relay determines the amount of power applied to the filter pad heater. This process continues until the cold condition is cleared, or the AC mains power is removed.

When mains power is not available, battery power is used selectively in the following manner:

During a cold start, the operator is alerted of cold filter condition via a blinking indicator light (LED).

On receiving a command (push button) from the operator, the system begins heating the filter, using the battery-inverter combination.

When the filter has been pre-heated, the operator is alerted of a ready condition via the indicator light turning on continuously.

At this stage the state of the system has the filter pad heater off, but with enough heat in the mass of the filter to prevent 'gelling' of the fuel. The operator then starts the engine as normal.

The controller detects the engine run condition by monitoring the battery system voltage. If it is above a pre-set value, it indicates the alternator is running, and the system continues to heat the filter pad heater through the inverter, without draining the battery. The system may operate in open or closed loop.

At any time if the battery/alternator voltage drops below the low voltage set-point, the controller shuts off all power to the DC to AC inverter. This prevents potential damage to the battery and/or alternator and the inverter.

At any time if the battery/alternator voltage rises above the high voltage set-point, the controller shuts off all power to the DC or AC inverter. This prevents potential damage to the battery and/or alternator and the inverter.

When the system activates or de-activates the inverter, the load on the battery changes. This causes the battery system voltage to raise or lower. The controller uses Hysteresis to prevent cycling of the system, preventing oscillation caused by removing the load from the battery and the voltage of the battery voltage subsequently rising.

The system is capable of detecting a fault of the battery/alternator sensing circuit. If the measured voltage is above or below a pair of pre-set values, the controller shuts down power to the filter pad heaters.

The system is capable of detecting shorted and open temperature sensors. If a bad sensor condition is detected, the controller shuts down power to the filter pad heaters.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
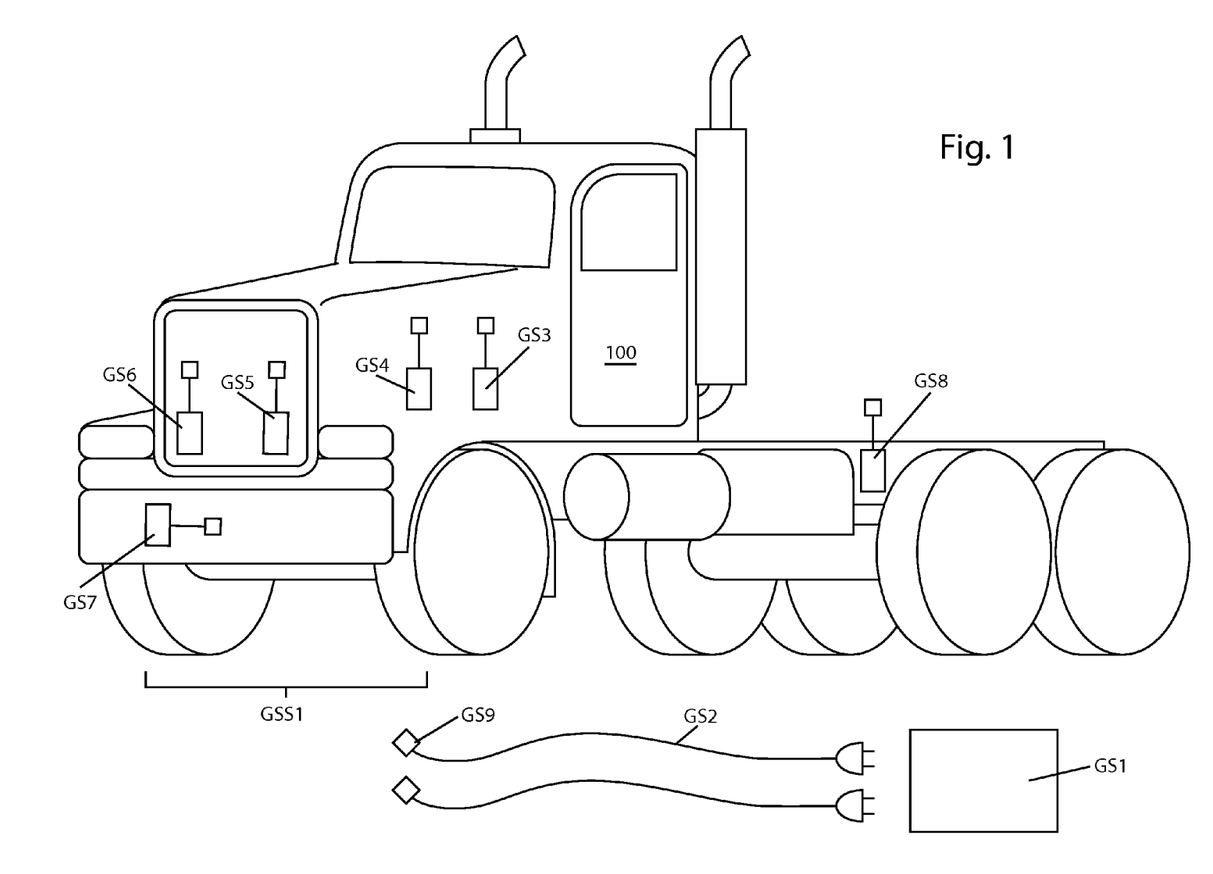
FIG. 1 is a schematic of a truck with an AC/DC embodiment heater.

Referring first to FIG. 1 a truck 100 is outfitted with a heater system GSS 1 that has a controller GS9 mounted in a tow truck. The power supply GS1 could be house AC (mains) or a generator or an inverter. Power wire GS2 is weatherproof to serve a truck parked outside in freezing weather. The diesel fuel filter GS3 has the heater blanket 50 of FIG. 5 attached. This system is designed to start a stalled vehicle.

Optional heaters include the heater blanket 50 on the fuel water separator filter GS4, the oil filter GS5, the coolant filter GS6, the air dryer filter GS7, and the hydraulic filter GS8.

Figure 2:
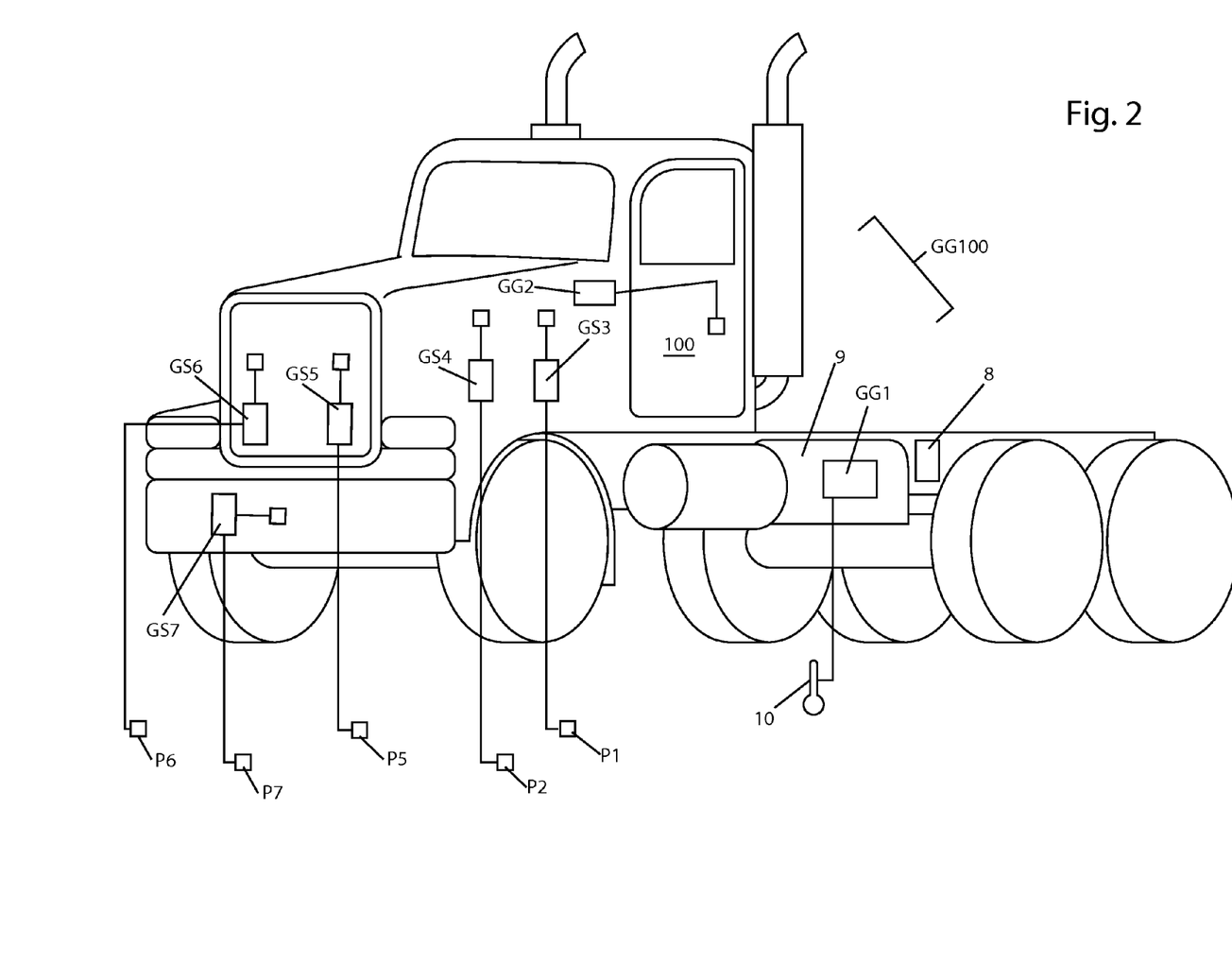
FIG. 2 is a schematic of a truck with a DC embodiment heater.

Referring next to FIG. 2 a truck mounted gel guard system GG100 is shown. The controller GG1 has a cab mounted LED display GG2. The battery box 9 powers the system GG100. An ambient air temperature sensor 10 triggers the controller GG1.

The same heater blankets 50 are used on the same numbered parts as in FIG. 1. However, each heater blanket 50 is attached to an output port of the controller numbered P1-P7. See FIG. 8. Thus, the controller logic powers each heater blanket 50 based on variables shown in FIGS. 3, 4.

Figure 5:
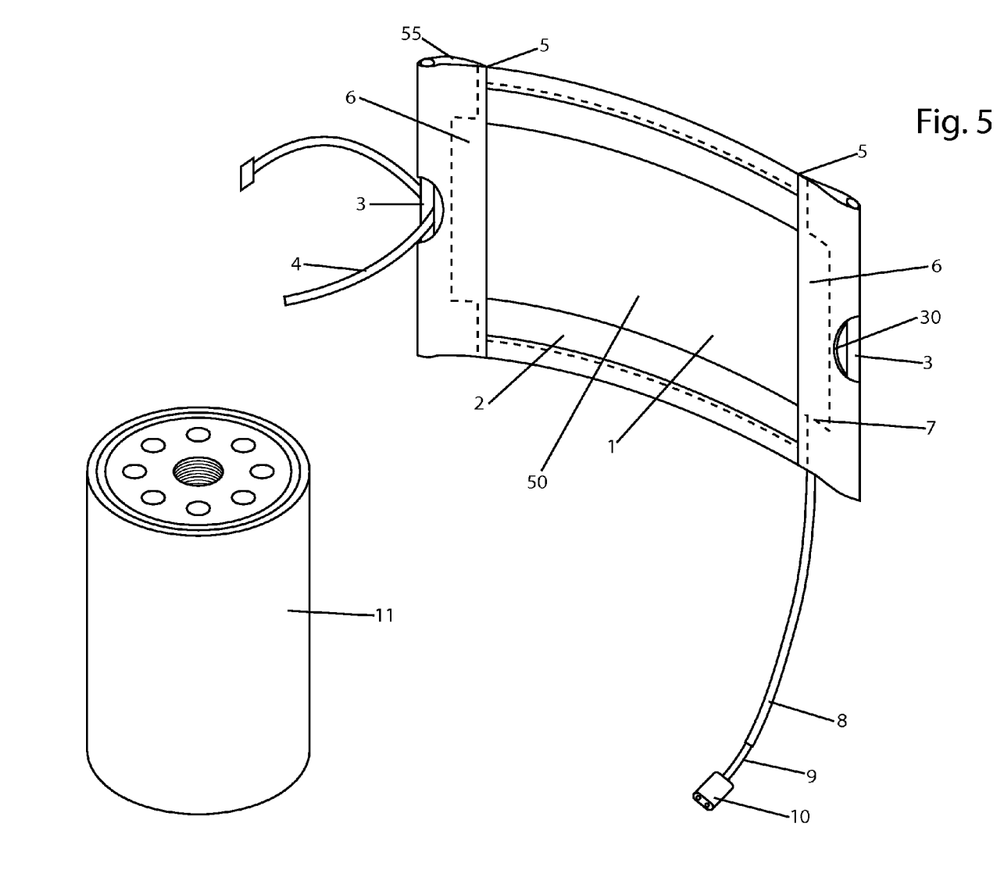
FIG. 5 is a front perspective view of the heat strip.
Figure 6:
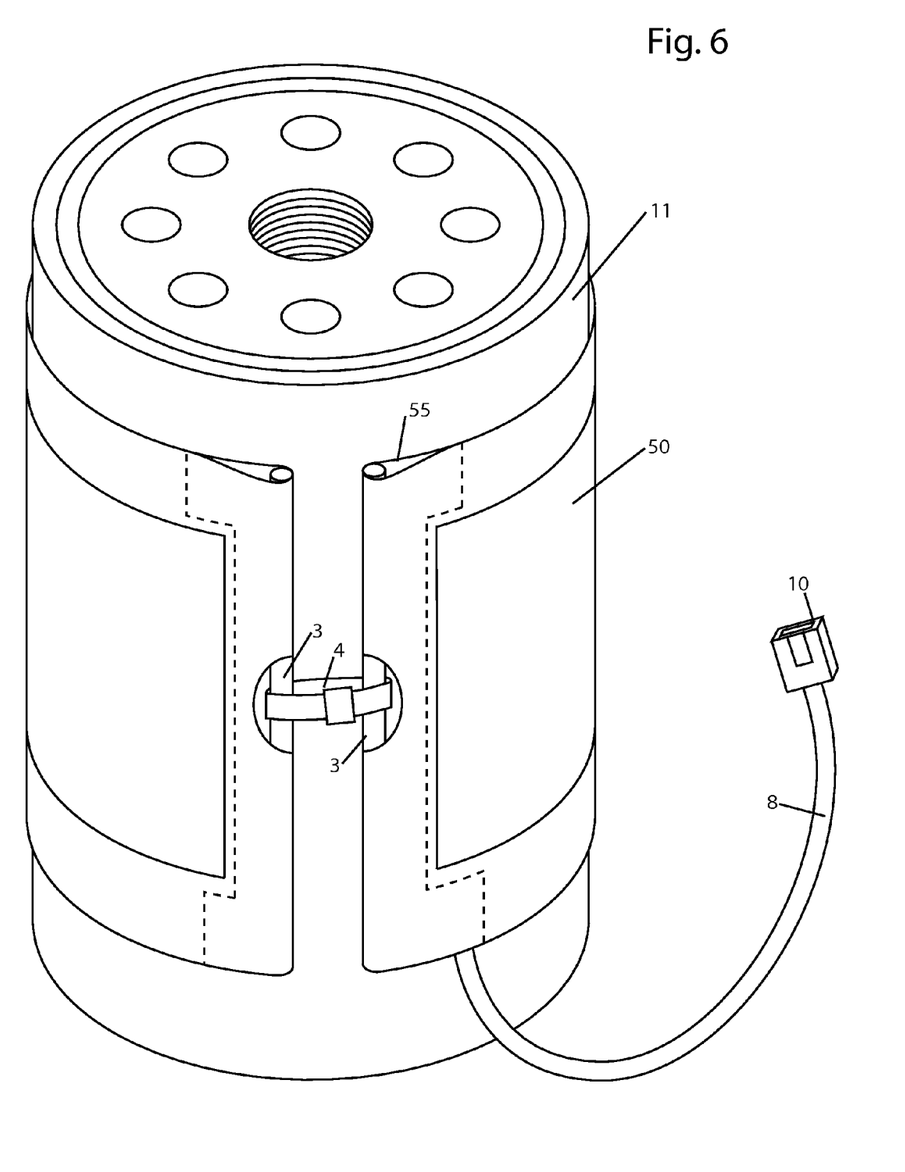
FIG. 6 is a front perspective view of the heat strip installed on a fuel filter.

Referring next to FIG. 5 the heater blanket 50 is preferably silicone coated fiberglass fabric 2 heated by a 120 volt AC, 2.5 to 5 watt per square inch silicone rubber heating pad 1. The insulating fiberglass fabric 2 could be supplied by AVS Industries, LLC, New Castle, Del., model Libub-2-C26 series. The heating pad 1 could be supplied by Omega Engineering, Inc., model SSHB or SRMU, SEPHB series. A ¼" aluminum stiffener rod 3 is sewn into each end with a cutout 30 allowing for a fastener 4 (such as a cable tie) to join the ends together as shown in FIG. 6. The pockets 55 are made with insulated stranded wire weather seal 5. The heating pad retention pockets 6 are shown.

The wire lead 9 is protected by a heat shrink insulation 8. The wire lead 9 extends thru the sleeve opening 7. Power is supplied via the weather sealed connector 10. The heater blanket 50 is secured tightly around the diesel fuel filter 11 (or other devices) with a cable tie 4 as shown in FIG. 6.

Figure 7:
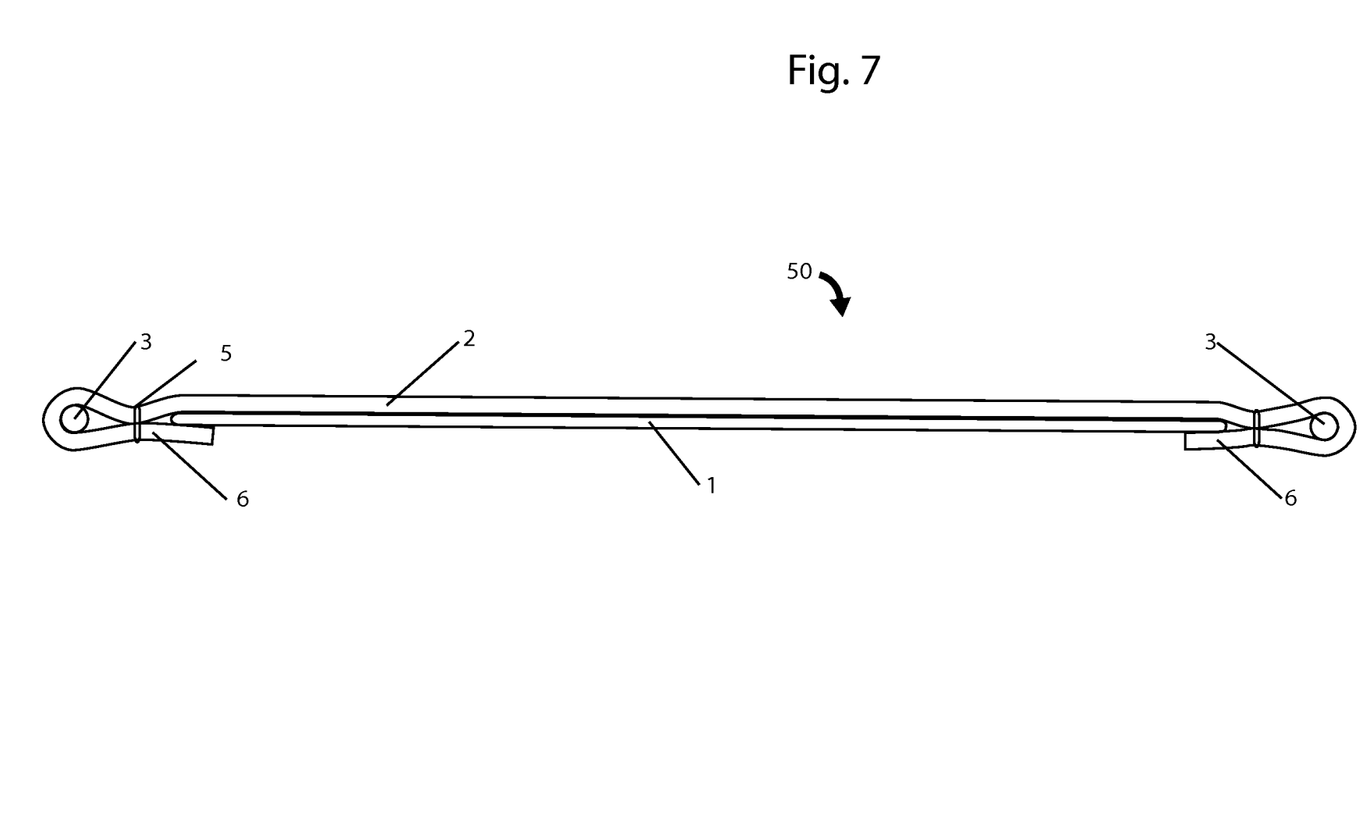
FIG. 7 is a top plan view of the heat strip.

In FIG. 7 it can be seen that the heater pad 1 slides into pockets 6. Stitching is optional.

Figure 8:
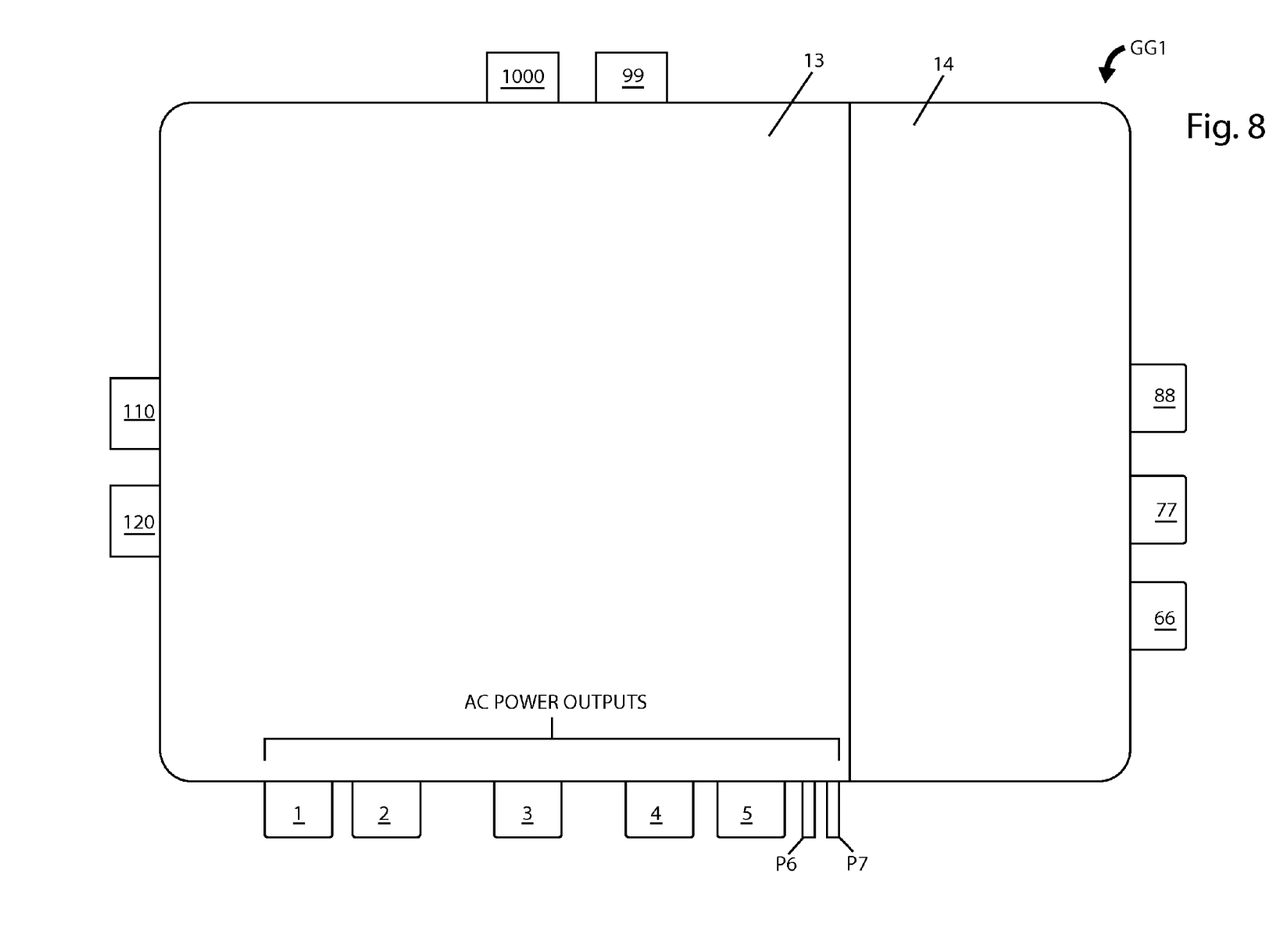
FIG. 8 is a schematic of the controller.

In FIG. 8 the controller GG1 has control logic section 13 with a remote ambient air temperature sensor 10 seen in FIG. 2. An optional built in inverter 14 is shown with battery positive port 66, inverter positive port 77 and optional 12 volt trickle charge port 88. The battery ground/ignition positive/driver input signal port 99 is shown. An optional outside inverter port 110 is shown for use if inverter 14 is missing. Port 120 is 120 volt AC input. Since the heater pads 1 use 120 volt AC, the inverter 14 is used to convert battery power to AC. Not shown are the various heater pad 1 temperature output wires and input ports to controller GG1.

Figure 3:
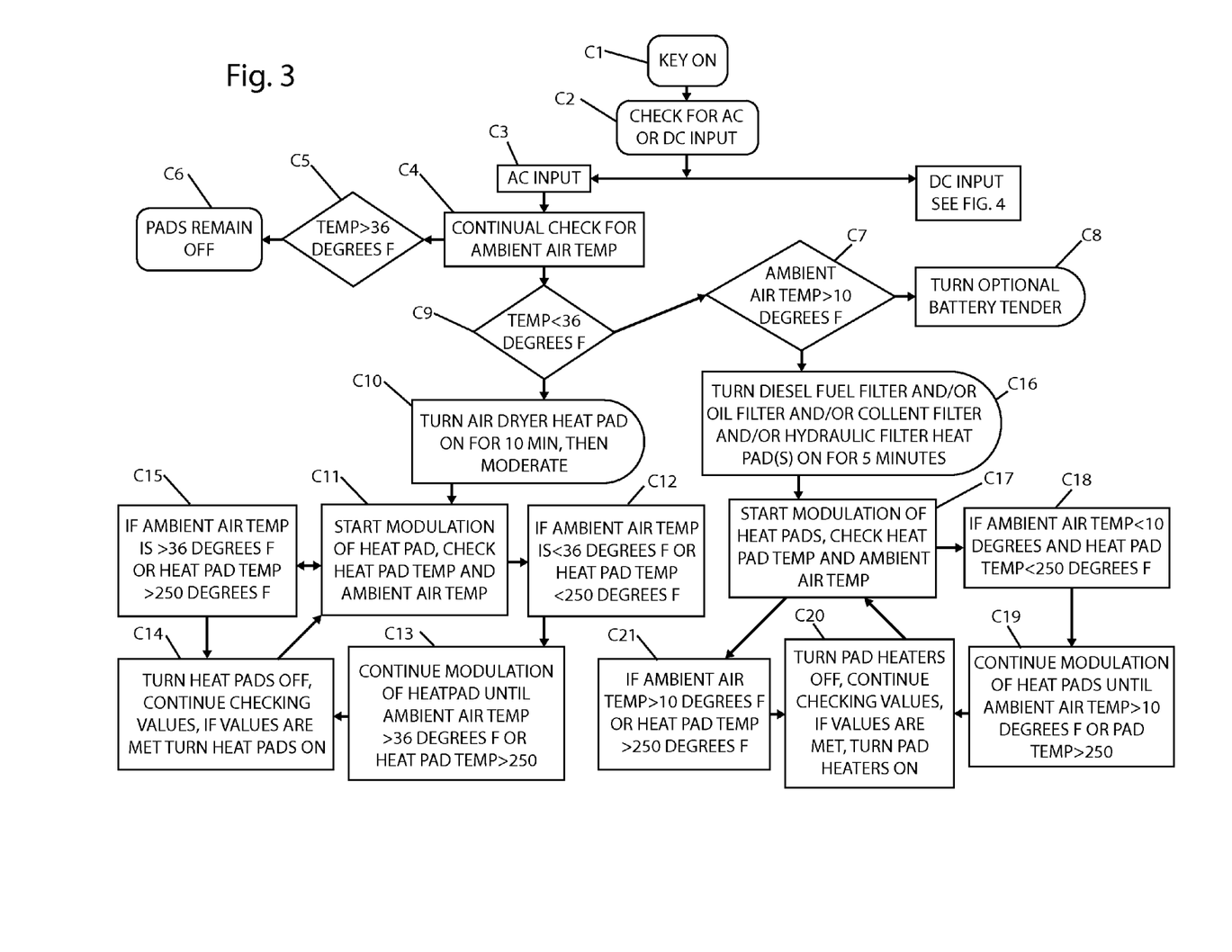
FIG. 3 is a flowchart for A/C operation.
Figure 4:
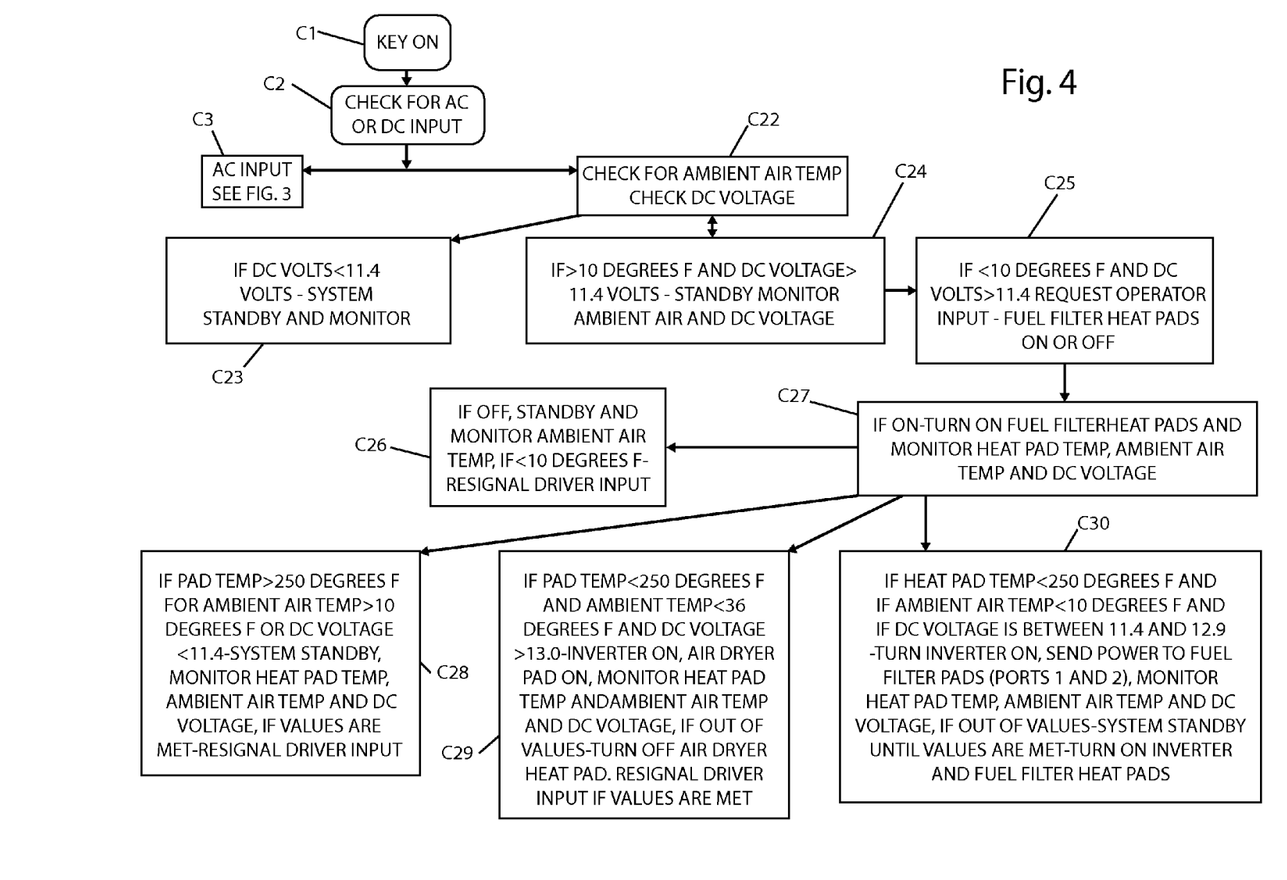
FIG. 4 is a flowchart for DC operation.

Refer next to FIGS. 3, 4. The logic for system GG100 of FIG. 2 is shown.

Box C1 is ignition key ON. Box C2 shows the controller 13 checking for either a DC or an AC power source (indication the truck is parked and using a land power source). Box C3 indicates an AC power source. Box C4 indicates a constant monitoring of ambient air temperature sensor 10. Box C5, C6 show the controller not powering any heater blankets 50 when the ambient air is above 36 degrees F. If the ambient air is below 10° F., then boxes C7, C8 show the controller 13 powering up an optional battery tender/charger.

When the temperature drops below 36° F. in box C9, then the controller 13 turns on the air dryer heater blanket for ten minutes then modulates it in boxes C10, C11. Box C12 shows temperature under 36° F. and heat pad temperature under 250° F., so box C13 continues power modulation until heat pad temperature reaches over 250° F. Then box C14 turns OFF the heat pad and maintains monitoring both ambient and heater pad temperature. Box C15 shows power OFF to heater pads if ambient is over 36° F. or heater pad is over 250° F.

Box C16 shows an ambient less than 10° F. powering up heater pads for the diesel fuel filter and/or coolant filter and/or the hydraulic filter for five minutes. Box C17 shows power modulation after five minutes. Boxes C18, C19 show continuing modulation if ambient under 10° F. and heater pads (C18), and power OFF otherwise (C19). Box C20 shows constant monitoring of ambient and heater pad(s). If setpoint met, then return to modulation. Box C21 shows power OFF if ambient over 10° F. or pad(s) too hot at over 250° F.

FIG. 4 shows an on the road operation with only DC battery power available at box C22. To protect the batteries, box C23 keeps the system on standby if volts are less than 11.4 DC. Box C24 shows strong battery voltage over 11.4 volts and an ambient over 10° F. still keeping the system on standby. In box C25 the temperature dropped to under 10° F., so the controller 13 requires a driver input to be ON. Box C26 maintains standby per the driver's control switch on OFF. Box C27 power up the fuel filter heater pad.

Box C28 shows the standby power OFF conditions as ambient above 10° F. or low battery or over heated pad and if these conditions require power on, then resignal driver's permission.

Box C29 shows the need for power ON, temperature between 10° F. and 36° F., then the inverter is turned on to power the air dryer pad and monitor pad heat.

Box C30 shows temperature dropped to below 10° F. so fuel filter pad(s) turned ON. Pad temperature(s) is monitored.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A heated and insulated blanket for a filter with a fluid passing therethrough, said blanket comprising:
    an outer insulated layer having a first vertical end pocket and a second vertical end pocket;
    each vertical end pocket having a rigid post therein;
    each vertical end pocket having a heating pad retention pocket facing toward a center of the blanket on an inside surface of the blanket;
    a heating pad inserted between the heating pad retention pockets;
    a power cord extending from the heating pad;
    wherein a coupler urges the first rigid post toward the second rigid post when the blanket surrounds the filter;
    wherein the heating pad further comprises a silicone rubber pad with a 120 volt AC, 2.5 to 5 watt per square inch mesh;
    an AC power source connected to the power cord;
    wherein the AC power source is mounted on a truck;
    a microprocessor mounted in the truck and having a control algorithm connected to the AC power source;
    an ambient temperature sensor connected to the microprocessor;
    a heating pad temperature sensor;
    said control algorithm modulating the AC power source to turn on when the ambient temperature drops below about 36° F.; and
    said control algorithm stopping the AC power if the heating pad temperature goes above about 250° F.

2. The blanket of claim 1, wherein the outer insulated layer further comprises a silicone coated fiberglass fabric.

3. The blanket of claim 2, wherein the coupler further comprises a cable tie.

4. The blanket of claim 1, wherein the power cord extends through a vertical end pocket opening.

5. The blanket of claim 1, wherein the control algorithm further comprises the steps of maintaining a set point temperature for the heating pad using the heating pad temperature sensor.

6. The blanket of claim 1 further comprising a temperature indicator in a vehicle control compartment using a heating pad temperature sensor signal.

7. The blanket of claim 6 further comprising a manual power on switch for blanket power in the vehicle control compartment.

8. The blanket of claim 1, wherein the truck having the AC power source and the microprocessor is the same truck having the heated and insulated blanket.

9. The blanket of claim 1, wherein the truck having the AC power source and the microprocessor is a service truck.

10. The blanket of claim 8, wherein the truck further comprises a battery drain sensor connected to the microprocessor, and the control algorithm stops the AC power if the battery drain sensor passes a threshold valve.

* * * * *